United States Patent Office 3,022,329
Patented Feb. 20, 1962

3,022,329
METHOD FOR THE MANUFACTURE OF O-ARYL PHOSPHORODICHLORIDOTHIOATES
Henry Tolkmith, Harold R. Slagh, and Kenneth C. Kauer, Midland, Mich., assignors to The Dow Chemical Company, Midland, Mich., a corporation of Delaware
No Drawing. Filed Mar. 5, 1956, Ser. No. 569,299
6 Claims. (Cl. 260—461)

The present invention is concerned with an improved method for the manufacture of O-aryl phosphorodichloridothioates of the following formula

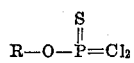

In this and succeeding formulae, R represents an aryl radical. The term "aryl" as herein employed refers to the aromatic hydrocarbon radicals whether substituted or unsubstituted with one or more substituents including chlorine, bromine, alkyl, alkoxy, cyclohexyl, benzyl and phenyl. These compounds are valuable as intermediates for the preparation of complex phosphorus derivatives, and particularly for the production of O-aryl O-alkyl phosphorochloridiothioates, O-aryl O-alkyl phosphoroamidothioates and O-aryl O,O-dialkyl phosphorothioates. In such use the O-aryl phosphorodichloridothioate intermediate (1) is reacted with an alkali metal alcoholate to replace one chlorine atom, (2) is reacted successively with an alkali metal alcoholate and with ammonia to replace both chlorine atoms, and (3) is reacted with an alkali metal alcoholate to replace both chlorine atoms. The O-aryl O-alkyl phosphorochloridothioates, O-aryl O-alkyl phosphoroamidothioates and O-aryl O,O-dialkyl phosphorothioates are useful as preservatives for paper, paint and wood and as parasiticides for the control of bacteria, fungi, mites and insects, such as aphids, southern army worms and flies.

Several methods for preparing the O-aryl phosphorodichloridothioates are known. In one method the compounds may be prepared from the reaction of an O-aryl dichlorophosphite with phosphorus thiochloride. Concerning this reaction the art teaches the employment of equimolecular proportions of the O-aryl dichlorophosphite and phosphorus thiochloride and that the sulfur of the phosphorus thiochloride is added to the phosphorus atom of the dichlorophosphite with the formation of an O-aryl phosphorodichloridiothioate and phosphorus trichloride. This method results in yields of about 55 percent of the phosphorodichloridothioates.

It is an object of the present invention to provide an improved method for the production of O-aryl phosphorodichloridothioates. It is a further object to provide a method which gives increased yields of the O-aryl phosphorodichloridothioates. An additional object is the provision of a method which gives O-aryl phosphorodichloridothioates in a greater yield than has previously been obtainable by known methods. Other objects will become apparent from the following specification and claims.

The new and improved process comprises heating one molecular proportion of an O-aryl dichlorophosphite (R—O—P=Cl$_2$) with at least 1.8 molecular proportions of phosphorus thiochloride while driving-off phosphorus trichloride (PCl$_3$) of reaction from the reaction mixture and until no further substantial amounts of phosphorus trichloride are evolved. When the evolution of phosphorus trichloride is substantially complete, the reaction mixture may be distilled under reduced pressure to separate the desired O-aryl phosphorodichloridothioate product as a viscous liquid. This new process gives greater yields of the O-aryl phosphorodichloridothioates than have previously been obtainable by known methods.

The proportion of at least 1.8 moles of phosphorus thiochloride per mole of O-aryl dichlorophosphite is essential for the production of the improved yields of the O-aryl phosphorodichloridothioates. The employment of an excess of the phosphorus thiochloride in the amount of from 2.0 to 3.0 moles per mole of O-aryl dichlorophosphite gives optimum yields of the desired products. A large excess of phosphorus thiochloride may be employed but is undesirable from the standpoint of economy.

The mixture of the phosphorus thiochloride and O-aryl dichlorophosphite is heated at a temperature at which phosphorus trichloride of reaction is evolved from the mixture of reagents. The evolution of phosphorus trichloride and reaction between the phosphorus thiochloride and O-aryl dichlorophosphite takes place smoothly at temperatures greater than 120° C. In a convenient method of operation, the reaction is carried out at the boiling temperature of the reaction mixture. The driving-off of phosphorus trichloride of reaction from the reaction mixture as formed constitutes an essential feature of the present method.

The rate at which the reaction takes place varies directly with the temperature employed and also with the particular O-aryl dichlorophosphite employed. For example, the O-aryl dichlorophosphites containing very negative substituents such as halogen in the O-aryl structure add sulfur somewhat more rapidly than many of the other dichlorophosphites. The reaction is usually carried out over a period of from 2 to 7 hours; the evolution of phosphorus trichloride of reaction being substantially complete in such a period.

Where it is desired to recover the phosphorus trichloride of reaction, the reaction may be carried out under somewhat reduced pressure. Such separation constitutes a preferred method of operation.

The O-aryl dichlorophosphites employed as starting materials in accordance with the present invention may be prepared by reacting phosphorus trichloride with a suitable phenol (ROH) in the presence of magnesium chloride as catalyst. The reaction takes place smoothly at the boiling temperature of the reaction mixture with the evolution of hydrogen chloride of reaction. Good results are obtained when employing from 3 to 7 moles of phosphorus trichloride with each mole of phenol. In carrying out the reaction, the phenol, catalyst and phosphorus trichloride are mixed together and heated at the boiling temperature. Upon completion of the reaction, as is evidenced by the cessation of hydrochloride evolution, the reaction mixture is distilled under reduced pressure to separate unreacted phosphorus trichloride and obtain the desired O-aryl dichlorophosphite as a liquid residue.

The following examples illustrate the invention but are not to be construed as limiting.

*Example 1*

O-(2,4,5-trichlorophenyl) dichlorophosphite (1791 grams, 6 moles) and 2034 grams (12 moles) of phosphorus thiochloride were mixed together and the resulting mixture heated with stirring at the boiling temperature for 4 hours. During this period the temperature of the reaction mixture rose from 125° C to 155° C. At the beginning of and through a portion of the heating period, phosphorus trichloride of reaction was evolved from the reaction mixture. Toward the end of the heating period no further substantial amounts of phosphorus trichloride were evolved. Following the reaction, the mixture was fractionally distilled under reduced pressure to separate an O-(2,4,5-trichlorophenyl) phosphorodichloridothioate product in a yield of 79 percent based upon the O-(2,4,5-trichlorophenyl) dichlorophosphite starting material. O-(2,4,5-trichlorophenyl) phosphorodichloridothioate boils at 174°–176° C. at 10 millimeters pressure.

Example 2

O-(2,4,5-trichlorophenyl) dichlorophosphite (358 grams, 1.2 moles) was mixed with phosphorus thiochloride to produce a reaction system containing 1.15 moles of phosphorus thiochloride per mole of the dichlorophosphite. In a similar manner other reaction systems were prepared containing 1.3 and 2 moles of phosphorus thiochloride per mole of O-(2,4,5-trichlorophenyl)phosphite.

Each of the above systems was heated with stirring at the boiling temperature for a period of three hours. During this period the boiling temperatures of the systems rose from about 135° to 150° C. During the reaction the phosphorus trichloride of reaction was driven out of the reaction systems. Toward the end of the heating period no further substantial amounts of phosphorus trichloride were evolved. Following the reactions, the reaction mixtures were fractionally distilled under reduced pressure to separate O-(2,4,5-trichlorophenyl) phosphorodichloridothioate. The yields of O-(2,4,5-trichlorophenyl) phosphorodichlorodothioate for the various systems are set forth in the following table; the yields being based upon the O-(2,4,5-trichlorophenyl) dichlorophosphite starting material:

| Mole Ratio of Reagents | | Percent yield of O-2,4,5-trichlorophenyl) phosphorodichloridothioate |
|---|---|---|
| 2,4,5-trichlorophenyl dichlorophosphite | Phosphorus Thiochloride | |
| 1 | 1.15 | 55.7 |
| 1 | 1.30 | 57.2 |
| 1 | 2.00 | 86.0 |

Example 3

Various substituted phenols were reacted with phosphorus trichloride to prepare the corresponding O-aryl dichlorophosphites. In such operations the phenol was mixed with an excess of the phosphorus trichloride and the resulting mixture heated with stirring at the boiling temperature (75°–83° C.) until the evolution of hydrogen chloride of reaction was substantially complete. The mixtures were then distilled at gradually increasing temperatures up to a temperature of 125° C. to separate unreacted phosphorus trichloride and obtain the O-aryl dichlorophosphite as a liquid residue.

The O-aryl dichlorophosphites so obtained were thereafter cooled to room temperature and mixed with phosphorus thiocloride in the amount of at least two moles of phosphorus thiochloride per mole of dichlorophosphite. These reaction systems were then heated at the boiling temperature whereby phosphorus trichloride of reaction was evolved from the mixture of reactive agents. When the evolution of phosphorus trichloride was substantially complete, the reaction mixtures were fractionally distilled to separate the O-aryl phosphorodichloridothioates. The nature of the prepared O-aryl phosphorodichloridothioates together with their yields as based upon the phenol starting materials are set forth in the following table:

| Phosphorodichloridothioate | Boiling Range of Phosphorodichloridothioate in millimeters pressure | Percent yield of O-aryl Phosphorodichloridothioate |
|---|---|---|
| O-(2-isopropylphenyl) | 122°–126° C. at 6 mm. | 89.4 |
| O-(2-secondarybutylphenyl) | 129°–136° C. at 7 mm. | 88.2 |
| O-(2-phenylphenyl) | 167°–174° C. at 4 mm. | 81.5 |
| O-(4-methoxyphenyl) | 127°–134° C. at 3 mm. | 77.0 |
| O-(2-chloro-4-tertiarybutylphenyl) | 156°–165° C. at 4 mm. | 87.0 |
| O-(2-bromo-4-phenylphenyl) | 198° C. at 1 mm. | 82.0 |
| O-(3-ethylphenyl) | 141°–148° C. at 9 mm. | 96.0 |

In a similar manner, the method of the present invention may be employed to obtain the very desirable yields of other O-aryl phosphorodichloridothioates as follows:

O-(4-phenylphenyl) phosphorodichloridothioate by reacting phosphorus thiochloride with O-(4-phenylphenyl) dichlorophosphite.

O-(2,4-dichlorophenyl) phosphorodichloridothioate by reacting phosphorus thiochloride with O-(2,4-dichlorophenyl) dichlorophosphite.

O-(4-cyclohexylphenyl) phosphorodichloridothioate by reacting phosphorus thiochloride with O-(4-cyclohexylphenyl) dichlorophosphite.

O-(4-bromophenyl) phosphorodichloridothioate by reacting phosphorus thiochloride with O-(4-bromophenyl) dichlorophosphite.

O-(4-benzylphenyl) phosphorodichloridothioate by reacting phosphorus thiochloride with O-(4-benzylphenyl) dichlorophosphite.

O-(4-chlorophenyl) phosphorodichloridothioate by reacting phosphorus thiochloride with O-(4-chlorophenyl) dichlorophosphite.

We claim:

1. A method for the manufacture of an O-aryl phosphorodichloridothioate which comprises reacting at a temperature of at least 120° C. one molecular proportion of an O-aryl dichlorophosphite with at least 1.8 molecular proportions of phosphorus thiochloride while driving off phosphorus trichloride of reaction from the reaction mixture, the O-aryl in said O-aryl phosphorodichloridothioate and O-aryl dichlorophosphite being an O-aryl radical of the benzene series.

2. A method claimed in claim 1 wherein one molecular proportion of the O-aryl dichlorophosphite is heated with from 2 to 3 molecular proportions of phosphorus thiochloride.

3. A method claimed in claim 1 wherein a mixture of the O-aryl dichloridophosphite and phosphorus thiochloride is heated at the boiling temperature.

4. A method claimed in claim 1 wherein the O-aryl dichloridophosphite is O-(2,4,5-trichlorophenyl) dichlorophosphite.

5. A method claimed in claim 1 wherein the O-aryl dichlorophosphite is O-(2-chloro-4-tertiarybutylphenyl) dichlorophosphite.

6. A method claimed in claim 1 wherein the O-aryl dichlorophosphite is O-(2,4-dichlorophenyl) dichlorophosphite.

References Cited in the file of this patent

Gottlieb: "J. Am. Chem. Soc.," vol. 54, p. 748 (1932).